United States Patent
Stanze et al.

(10) Patent No.: US 10,383,020 B2
(45) Date of Patent: Aug. 13, 2019

(54) METHOD FOR INTERFERENCE REDUCTION IN A RADIO COMMUNICATION SYSTEM, PROCESSING UNIT, AND WIRELESS ACCESS NETWORK NODE THEREOF

(71) Applicant: Alcatel Lucent, Boulogne Billancourt (FR)

(72) Inventors: Oliver Stanze, Stuttgart (DE); Volker Braun, Stuttgart (DE); Christian Gerlach, Stuttgart (DE); Andreas Weber, Stuttgart (DE); Bozo Cesar, Stuttgart (DE)

(73) Assignee: Alcatel Lucent, Nozay (FR)

( * ) Notice: Subject to any disclaimer, the term of this patent is extended or adjusted under 35 U.S.C. 154(b) by 611 days.

(21) Appl. No.: 14/415,249

(22) PCT Filed: May 3, 2013

(86) PCT No.: PCT/EP2013/059249
§ 371 (c)(1),
(2) Date: Jan. 16, 2015

(87) PCT Pub. No.: WO2014/012689
PCT Pub. Date: Jan. 23, 2014

(65) Prior Publication Data
US 2015/0189568 A1  Jul. 2, 2015

(30) Foreign Application Priority Data

Jul. 17, 2012  (EP) .................................... 12305865

(51) Int. Cl.
*H04B 7/06* (2006.01)
*H04L 1/00* (2006.01)
(Continued)

(52) U.S. Cl.
CPC .......... *H04W 36/20* (2013.01); *H04B 7/0417* (2013.01); *H04B 7/0639* (2013.01);
(Continued)

(58) Field of Classification Search
CPC ..... H04W 36/20; H04W 36/00; H04W 36/30; H04W 36/0077; H04W 36/0094;
(Continued)

(56) References Cited

U.S. PATENT DOCUMENTS 8,447,236 B2   5/2013   Gorokhov et al.
8,750,152 B2   6/2014   Koo et al.
(Continued)

FOREIGN PATENT DOCUMENTS

CN   102027722 A   4/2011
EP   2 056 628 A1  5/2009
(Continued)

OTHER PUBLICATIONS

Sesia, Stefania, et al., "LTE—The UMTS Long Term Evolution: From Theory to Practice", Second Edition, 2011, pp. 272-274.
(Continued)

*Primary Examiner* — Ian N Moore
*Assistant Examiner* — Brian T Le
(74) *Attorney, Agent, or Firm* — Fay Sharpe LLP

(57) ABSTRACT

A method for interference reduction in a radio communication system is disclosed. The method includes receiving from a mobile station indications of radiation beams that are transmitted by a first base station of the radio communication system and that fulfill or exceed a predefined quality criterion at the mobile station, when the mobile station is attached to the first base station and when the mobile station is located within a first overlapping coverage area of the first base station and of a second base station of the radio communication system, and determining at least one radio
(Continued)

resource to be unused or to be transmitted with a limited transmission power by the first base station for at least one of the radiation beams based on the received indications for serving the mobile station or a further mobile station by the second base station with the at least one radio resource.

20 Claims, 6 Drawing Sheets

(51) Int. Cl.
| | | |
|---|---|---|
| H04L 1/06 | (2006.01) | |
| H04W 16/28 | (2009.01) | |
| H04W 36/00 | (2009.01) | |
| H04W 36/20 | (2009.01) | |
| H04W 36/30 | (2009.01) | |
| H04W 52/34 | (2009.01) | |
| H04W 52/36 | (2009.01) | |
| H04W 72/02 | (2009.01) | |
| H04W 72/04 | (2009.01) | |
| H04W 72/08 | (2009.01) | |
| H04B 7/0417 | (2017.01) | |

(52) U.S. Cl.
CPC ... *H04W 36/0077* (2013.01); *H04W 36/0094* (2013.01); *H04W 36/30* (2013.01); *H04W 52/367* (2013.01); *H04B 7/0617* (2013.01); *H04L 1/0026* (2013.01); *H04L 1/06* (2013.01); *H04W 16/28* (2013.01); *H04W 52/346* (2013.01); *H04W 72/02* (2013.01); *H04W 72/046* (2013.01); *H04W 72/082* (2013.01)

(58) Field of Classification Search
CPC . H04W 52/346; H04W 52/367; H04W 16/28; H04W 72/082; H04W 72/02; H04W 72/046; H04L 1/0026; H04L 1/06; H04B 7/0417; H04B 7/0617; H04B 7/0639
See application file for complete search history.

(56) References Cited

U.S. PATENT DOCUMENTS

| 9,072,020 B2 | 6/2015 | Li et al. |
|---|---|---|
| 2004/0131029 A1 | 7/2004 | Tobe et al. |
| 2009/0286482 A1 | 11/2009 | Gorokhov et al. |
| 2010/0128673 A1 | 5/2010 | Yamazaki et al. |
| 2010/0316020 A1 | 12/2010 | Kawagishi et al. |
| 2011/0051684 A1 | 3/2011 | Li et al. |
| 2012/0044909 A1 | 2/2012 | Jung et al. |
| 2013/0028207 A1 | 1/2013 | Okubo et al. |
| 2013/0058296 A1 | 3/2013 | Jitsukawa |

FOREIGN PATENT DOCUMENTS

| EP | 2166807 B1 | 12/2010 |
|---|---|---|
| EP | 2549814 A1 | 1/2013 |
| EP | 2613588 A1 | 7/2013 |
| JP | 2004-128966 A | 4/2004 |
| JP | 2011-130355 A | 6/2011 |
| JP | 2011-171837 A | 9/2011 |
| KR | 20110010116 A | 1/2011 |
| KR | 20110035807 A | 4/2011 |
| KR | 20120056836 A | 6/2012 |
| WO | WO 2005/013635 A1 | 2/2005 |
| WO | WO 2006/044464 A2 | 4/2006 |
| WO | WO 2008/123250 | 10/2008 |
| WO | WO 2011/135614 | 11/2011 |
| WO | WO 2012/034597 A1 | 3/2012 |

OTHER PUBLICATIONS

Krizman, Kevin J., et al., "Wireless Position Location: Fundamentals, Implementation Strategies, and Sources of Error", IEEE 47th Vehicular Technology Conference Proceedings, 1997, pp. 919-923.
Dardari, et al., "Satellite and Terrestrial Radio Positioning Techniques, A Signal Processing Perspective", Academic Press, 2011, pp. 75-105.
3GPP TS 36 211, Physical channels and modulation, Release 10, V10.0.0, Dec. 2010.
3GPP TS 36 213, Physical layer procedures, Release 10, V10.0.1, Dec. 2010.
3GPP TS 36 214, Physical layer; Measurements, Release 10, V10.1.0, Mar. 2011.
3GPP TS 36 814, Further advancements for E-UTRA physical layer aspects, Release 9, V9.0.0, Mar. 2010.
International Search Report for PCT/EP2013/059249 dated Jun. 7, 2013.
Taiwan Search Report for ROC (Taiwan) 102118288.
English Bibliography for Japanese Patent Application Publication No. JP2004128966A, published Apr. 22, 2004, printed from Derwent Innovation on Apr. 3, 2018, 5 pp.
English Bibliography for PCT Patent Application Publication No. WO 2008123250A1, Published Oct. 16, 2008, printed from Derwent Innovation on Apr. 3, 2018, 4 pp.
English Bibliography for PCT Patent Application Publication No. WO 2011135614A1, Published Nov. 3, 2011, printed from Derwent Innovation on Apr. 3, 2018, 4 pp.
English Bibliography for Chinese Patent Application Publication No. CN102027722A, published Apr. 20, 2011, printed from Derwent Innovation on Apr. 3, 2018, 9 pp.
English Bibliography for Japanese Patent Application Publication No. JP2011130355A, published Jun. 30, 2011, printed from Derwent Innovation on Apr. 3, 2018, 4 pp.
English Bibliography for Japanese Patent Application Publication No. JP2011171837A, published Sep. 1, 2011, printed from Derwent Innovation on Apr. 3, 2018, 4 pp.
EP Pat. App. No. 12305865.3, Extended European Search Report, dated Oct. 30, 2012, 8pp.
PCT Pat. App. No. PCT/EP2013/059249, Written Opinion of the International Searching Authority, dated Jun. 7, 2013, 8 pp.

METHOD FOR INTERFERENCE REDUCTION IN A RADIO COMMUNICATION SYSTEM, PROCESSING UNIT, AND WIRELESS ACCESS NETWORK NODE THEREOF

FIELD OF THE INVENTION

The invention relates to wireless communications and, more particularly but not exclusively, to interference reduction in a radio communication system.

BACKGROUND

In a heterogeneous radio communication system several types of wireless access network nodes are serving mobile stations. A radio access network of the radio communication system may provide for example so-called macro cells, so-called micro cells, so-called pico cells, and/or so-called femto cells in order to offer wireless coverage with a variety in size of wireless coverage zones for different environments, ranging from an open outdoor environment to office buildings, homes, and underground areas.

A macro cell is a radio cell in the radio communication system that provides broadest radio coverage by a highest output power and that may be located for example in rural areas or along highways. The macro cell is comparable to a base station of a 2G or 3G radio communication system (2G/3G=Second/Third Generation) such as GSM/GPRS (GSM=Global System for Mobile Communication, GPRS=General Packet Radio Service) or UMTS (UMTS=Universal Mobile Telecommunication Systems). Antennas for macro cells are mounted on ground-based masts, rooftops and other existing structures, at a height that provides a clear view over surrounding buildings and terrain.

A micro cell with a smaller coverage area than the macro cell may be deployed in a densely populated urban area. Pico cells are deployed for areas even smaller than those for micro cells. An example of usage for a pico cell would be a large office, a mall, or train station. Currently the smallest area of coverage can be implemented by a femto-cell, which may be deployed in homes or small offices.

In a downlink direction of radio frequency signals, which are transmitted from the wireless access network nodes to a mobile station, which is attached to and served by a smaller cell (micro cell, pico cell, femto cell), an interference situation within the smaller cell is usually dominated by the macro cell that covers the smaller cell or that intersects the smaller cell.

SUMMARY

For improving the downlink transmission to mobile stations served by one of the smaller cells, the dominating interference from the macro cell must be reduced or even removed. Thus, it is an object of the invention to reduce or eliminate interference in the smaller cells of the heterogeneous radio communication system and to increase an overall throughput in the heterogeneous radio communication system.

The object is achieved by a method for interference reduction in a radio communication system. The method contains the steps of receiving at a processing unit from at least one mobile station indications of radiation beams that are transmitted by a first base station of the radio communication system and that fulfill or exceed a predefined quality criterion at the at least one mobile station, when the at least one mobile station is attached to the first base station and when the at least one mobile station is located within a first overlapping coverage area of the first base station and of a second base station of the radio communication system, and determining at the processing unit at least one radio resource to be unused or to be transmitted with a predefined difference below a maximum transmission power by the first base station for at least one of the radiation beams based on the received indications for serving the at least one mobile station or at least one further mobile station by the second base station with the at least one radio resource. The object is further achieved by a processing unit and by a wireless access network node, which contains the processing unit.

The first base station may be for example a so-called macro base station, the second base station may be for example a so-called micro base station, a so-called pico base station or a so-called femto base station and the radio communication system may be for example a heterogeneous radio communication system.

A micro cell of the micro base station or a pico cell of the pico base station or a femto cell of the femto base station may be located for example within a macro cell of the macro base station or may intersect with the macro cell of the macro base station.

The predefined quality criterion may be for example a largest SNR (SNR=Signal to Noise Ratio) of radio frequency signals of one of the radiation beams received at the at least one mobile station, a largest SINR (SINR=Signal to Interference-plus-Noise Ratio) of the radio frequency signals of the one of the radiation beams received at the at least one mobile station, or a largest SIR (SIR=Signal to Interference Ratio) of the radio frequency signals of the one of the radiation beams received at the at least one mobile station.

Preferably, the predefined quality criterion is a radiation beam with a maximum received signal quality or belonging to a group of at least two radiation beams with a received signal quality above a predefined received signal quality. With respect to 3GPP LTE (3GPP=Third Generation Partnership Project, LTE=Long Term Evolution) the predefined quality criterion may be a best PMI (PMI=Precoding Matrix Indicator) such as defined in 3GPP TS 36.213 V10.0.1 (2010-12) section 7.2.4 and described in "LTE—The UMTS Long Term Evolution: From Theory to Practice", Stefania Sesia, Issam Toufik, Matthew Baker, John Wiley & Sons, Second Edition, 2011, Section 11.2.2.4. The best PMI indicates a radiation beam, which might be a best radiation beam for serving a mobile station, which has reported the best PMI.

The invention provides a main benefit of reducing or eliminating interference within the coverage area of the second base station. Thereby, a quality of service for mobile stations attached to the second base station can be optimized, a data throughput for the second base station can be increased and also the overall throughput in the radio communication system can be increased.

According to a first embodiment, the method further contains the step of controlling at the processing unit, whether the indications have been received at the first base station before or after a handover of the at least one mobile station from the first base station to the second base station or from the second base station to the first base station and a radiation beam indicated by one of the received indications is taken into account for the determining step, if the one of the received indications has been received before or after the handover. The advantage of the first embodiment is based on following facts: Regarding 3GPP LTE Release 8, the first base station may be an eNodeB (eNodeB=evolved Node B) and may contain a first base station antenna system with two or more antenna elements. This allows applying either a MIMO downlink transmission (MIMO=Multiple Input Multiple Output), if the at least one mobile station contains a mobile station antenna system with two or more antenna elements or a MISO downlink transmission (MISO=Multiple Input Singe Output), if the at least one mobile station contains a mobile station antenna system with a single antenna element. The at least one mobile station periodically reports to the first base station feedback information, which may contain three parameters (see for example 3GPP TS 36.213 V10.0.1 (2010-12) section 7.2): a CQI (CQI=channel quality indication), a PMI (PMI=precoding matrix indicator), and an RI (RI=rank indication). The CQI is a parameter, which indicates a channel quality of a downlink radiation beam with a largest average received modulated carrier power. For LTE Releases 8, 9 and 10, the CQI parameter is an index parameter for a transport format of the downlink channel. The PMI is a further index parameter, which indicates the downlink radiation beam for which the CQI parameter is reported. The PMI belongs to an entry of a codebook, which contains pre-coding vectors with all allowed transmit antenna weight combinations. The RI is a parameter, which is estimated by the at least one mobile station and which indicates a number of streams which con be sufficiently separated by a receiver of the at least one mobile station. If the at least one mobile station is attached or connected to the second base station, the at least one mobile station reports corresponding feedback information for downlink radiation beams of the second base station but no feedback information for the downlink radiation beams of the first base station. This means, the current releases of 3GPP LTE do not allow the second base station to get knowledge of an interfering radiation beam of the first base station, if the at least one mobile station is served by the second base station. This deficiency may be bypassed by monitoring a first handover procedure of the at least one mobile station from the first base station to the second base station and by assuming, that a first PMI of the first base station, which may be reported by the at least one mobile station shortly before the handover of the at least one mobile station, indicates a first radiation beam of the first base station, which interferes with radio frequency signals, which are transmitted by the second base station to the at least one mobile station or to the at least one further mobile station. This deficiency may also be bypassed by monitoring a second handover procedure of the at least one mobile station from the second base station to the first base station and by assuming, that a second PMI of the first base station, which may be reported by the at least one mobile station shortly after the handover of the at least one mobile station, indicates a second radiation beam of the first base station, which interferes with radio frequency signals, which are transmitted by the second base station to the at least one mobile station or to the at least one further mobile station. The first PMI and the second PMI may be identical or different. Correspondingly, the first radiation beam and the second radiation beam may be identical or different.

The first PMI or the second PMI, which has been reported while the at least one mobile station is connected to and served by the first base station and while the at least one mobile station is located in a range of the coverage area of the second base station, is the best PMI. Thereby, the best PMI is handled as a worst PMI, while the at least one mobile station or the at least one further mobile station is connected to and served by the second base station.

The first embodiment offers the further advantage of not requiring a standard amendment for introducing new signaling messages between the radio access network and the mobile stations in 3GPP LTE radio communication systems. The method of the preferred embodiment can be immediately applied for example to radio communication systems based on 3GPP LTE Releases 8, 9 and 10, if both, the first base station and the second base station are provided by a same manufacturer and proprietary signaling messages can be used on a so-called X2 interface between the first base station and the second base station, which is defined by 3GPP LTE. The method can be used for any mobile station, which is compliant to one of the 3GPP LTE Releases 8, 9 or 10.

According to a first option of the first embodiment, the controlling step may contain the sub-step of verifying, whether the indications have been received within a first predefined time interval before a handover of the at least one mobile station from the first base station to the second base station or within a second predefined time interval after a handover of the at least one mobile station from the second base station to the first base station and the radiation beam indicated by the one of the received indications is taken into account for the determining step, if the one of the received indications has been received within the first predefined time interval or within the second predefined time interval. A size of the first predefined time interval and the second predefined time interval may depend on a periodicity with which the at least one mobile station reports a PMI to the first base station. In case of 3GPP LTE, the periodicity can be adjusted in a large range. In case of reporting a wideband CQI and a PMI, a feedback period of for example 20 ms may be used for reporting PMIs. If for example three PMIs shall be collected within the first predefined time interval or the second predefined time interval, the first predefined time interval or the second predefined time interval may be set for example to 70 ms. If otherwise a further reporting mode is applied, in which a frequency selective CQI is reported, a further feedback period may be used, which may be a multiple of 20 ms. In such a case, the first predefined time interval or the second predefined time interval may be increased accordingly.

Thereby, one or several indications may be considered for the determining step, which have received within the first predefined time interval or within the second predefined time interval. By varying the first predefined time interval and the second predefined time interval, a number of indications to be collected for the determining step can be adapted or only that indications may be collected for the determining step, which hove been received most frequently during the first predefined time interval or the second predefined time interval. In comparison to a case, in which only for example the last reported best PMI before a handover form the first base station to the second base station or a first reported best PMI after a handover from the second base station to the first base station is collected, collecting two or more indications may be applied in a case, where for example two radiation beams overlap and a mobile station is only allowed to report the best PMI in a single transmission. If two or more indications are collected immediately before the handover from the first base station to the second base station or immediately after the handover from the second base station to the first base station, there will be a higher possibility, that the mobile station may report for example before or after the handover in a first transmission an indication for a first one of the two radiation beams and in a next transmission an indication for a second one of the two radiation beams. According to a second option of the first embodiment, the determining step comprises the sub-step of determining, which of the indications is a last indication received before a handover of the at least one mobile station from the first base station to the second base station or is a first indication received after a handover of the at least one mobile station from the second base station to the first base station and the radiation beam indicated by the one of the received indications is taken into account for the determining step, if the one of the received indications is the last indication or the first indication. In comparison to the first option, the second option only considers those indications, which have been immediately reported before or after the handover of the at least one mobile station. Thereby, fewer processing and memory resources may be required.

According to a second embodiment, the at least one mobile station may contain a receiver for receiving signals from a global navigation satellite system such as GPS (GPS=Global Positioning System), GLONASS or Galileo and the method may further contain the steps of determining at the at least one mobile station a position of the at least one mobile station within the radio communication system based on the receiver for receiving the signals from the global navigation satellite system, receiving at the processing unit location information of the position of the at least one mobile station from the at least one mobile station and determining at the processing unit, whether the at least one mobile station is located within the overlapping coverage area of the first base station and of the second base station based on the received location information.

According to third embodiment, the method may further contain the steps of storing by the processing unit the indications and an indication of the second base station to a mapping table and querying by the processing unit the mapping table before executing the determining step. This provides the advantages of providing a central or distributed database for all interfering radiation beams of the macro cells and of providing the possibility to allow for statistical evaluations such as selecting and keeping only those indications within the mapping table, which have been reported most with respect to the second base station or indications, which have been reported at least several times.

According to a fourth embodiment, a first radiation beam of the group of radiation beams may be adjacent to or overlaps with a second radiation beam of the radiation beams, the second radiation beam may be adjacent to or overlaps with a third radiation beam of the radiation beams, and the second radiation beam is taken into account for the determining step, if indications for the first radiation beam and the third radiation beam are received by the processing unit. Thereby, also indications of radiation beams may be stored to the mapping table and may be applied for the determining step, which overlap with a central area of the coverage area of the second base station but which don't overlap or only partly overlap with a border area of the coverage area of the second base station, that is most frequently traversed by mobile stations.

Preferably, a radiation beam indicated by one of the received indications is taken into account for the determining step, if the one of the radiation beams has been indicated with a predefined frequency of occurrence. The predefined frequency of occurrence may be for example 30% of all indications that have been reported for the overlapping coverage area of the first base station and the second base station in conjunction with a handover between the first base station and the second base station.

With respect to a fifth embodiment, the method further contains the step of applying for the coverage area of the second base station a range extension by either preventing a handover from the second base station to the first base station as long as a signal strength of first radio frequency signals transmitted by the first base station and measured by the at least one mobile station or by the at least one further mobile station is not a first predefined magnitude larger than a signal strength of second radio frequency signals transmitted by the second base station and measured the at least one mobile station or by the at least one further mobile station or by triggering a handover from the first base station to the second base station, if the signal strength of the second radio frequency signals and measured by the at least one mobile station or by the at least one further mobile station is at most the first predefined magnitude smaller than the signal strength of the first radio frequency signals and measured by the at least one mobile station or by the at least one further mobile station, selecting with a predefined time period the at least one mobile station or the at least one further mobile station, and applying for the selected at least one mobile station or the selected at least one further mobile station no range extension for the coverage area of the second base station by triggering the handover from the second base station to the first base station, if the signal strength of the second radio frequency signals and measured by the at least one mobile station or by the at least one further mobile station is a second predefined magnitude smaller than the signal strength of the first radio frequency signals and measured by the at least one mobile station or by the at least one further mobile station or by preventing the handover from the first base station to the second base station as long as the signal strength of the second radio frequency signals and measured by the at least one mobile station or by the at least one further mobile station is at least the second predefined magnitude larger than the signal strength of the first radio frequency signals and measured by the at least one mobile station or by the at least one further mobile station and by setting the first predefined magnitude larger than the second predefined magnitude. By using the fifth embodiment, at least one mobile station will exist from time to time for which no range extension is applied. Such a mobile station is able to come closer to the central region of the coverage area of the second base station before a handover between the first base station and the second base station is performed.

According to a sixth embodiment, the method further contains the step of verifying at the processing unit, whether an indication for one of the radiation beams has been received from the at least one mobile station, when the at least one mobile station is traversing the coverage area of the second base station with a speed that is equal to or exceeds a predefined speed value for preventing a handover of the at least one mobile station from the first base station to the second base station and the radiation beam indicated by the one of the received indications is taken into account for the determining step, if the at least one mobile station is traversing the coverage area of the second base station with the speed that is equal to or exceeds the predefined speed value. This provides the advantage to use the reporting of indications of fast mobile stations, which ore only or preferably scheduled by macro cells and which don't perform handover procedures from macro cells to micro cells, pico cells or femto cells, to get knowledge of interfering radiation beams of the macro cells within the coverage areas of the micro cells, pico cells or femto cells.

Regarding a seventh embodiment, the at least one further mobile station may be located within a second overlapping coverage area of the first base station and of the second base station and the method may further contains the steps of determining at the processing unit at least one further radio resource to be unused or to be transmitted with the limited transmission power by the first base station for at least one further radiation beam based on the received indications for serving the at least one further mobile station by the second base station with the at least one further radio resource, and transmitting from the processing unit to the second base station a first indication or several first indications for the at least one radio resource and a second indication or several second indications for the at least one further radio resource. This may provide at the second base station a better knowledge of the interference situation and may increase a performance of the second base station.

According to an eight embodiment, the method may further contain the step of transmitting from the processing unit to the second base station an identifier for the at least one mobile station, an identifier for the at least one further mobile station, an indication, that the at least one radio resource is applicable for the at least one mobile station and a further indication, that the at least one further radio resource is applicable for the at least one further mobile station. If two or more radiation beams of the first base station overlap with the coverage area of the second base station, if a first mobile station, which is connected to the second base station, is localized within a first overlap area of a first radiation beam of the first base station and the coverage area of the second base station and if at least a second mobile station, which is also connected to the second base station, is localized within a second overlap area of a second radiation beam of the first base station and the coverage area of the second base station, this may provide at the second base station an even better knowledge of the interference situation for the at least one mobile station and the at least one further mobile station, because the second base station knows, which radiation beam of the first base station provides interference to which mobile station, which is connected to the second base station.

Further advantageous features of the invention are defined and are described in the following detailed description of the invention.

BRIEF DESCRIPTION OF THE FIGURES

The embodiments of the invention will become apparent in the following detailed description and will be illustrated by accompanying figures given by way of non-limiting illustrations.

DESCRIPTION OF THE EMBODIMENTS

Figure 1:
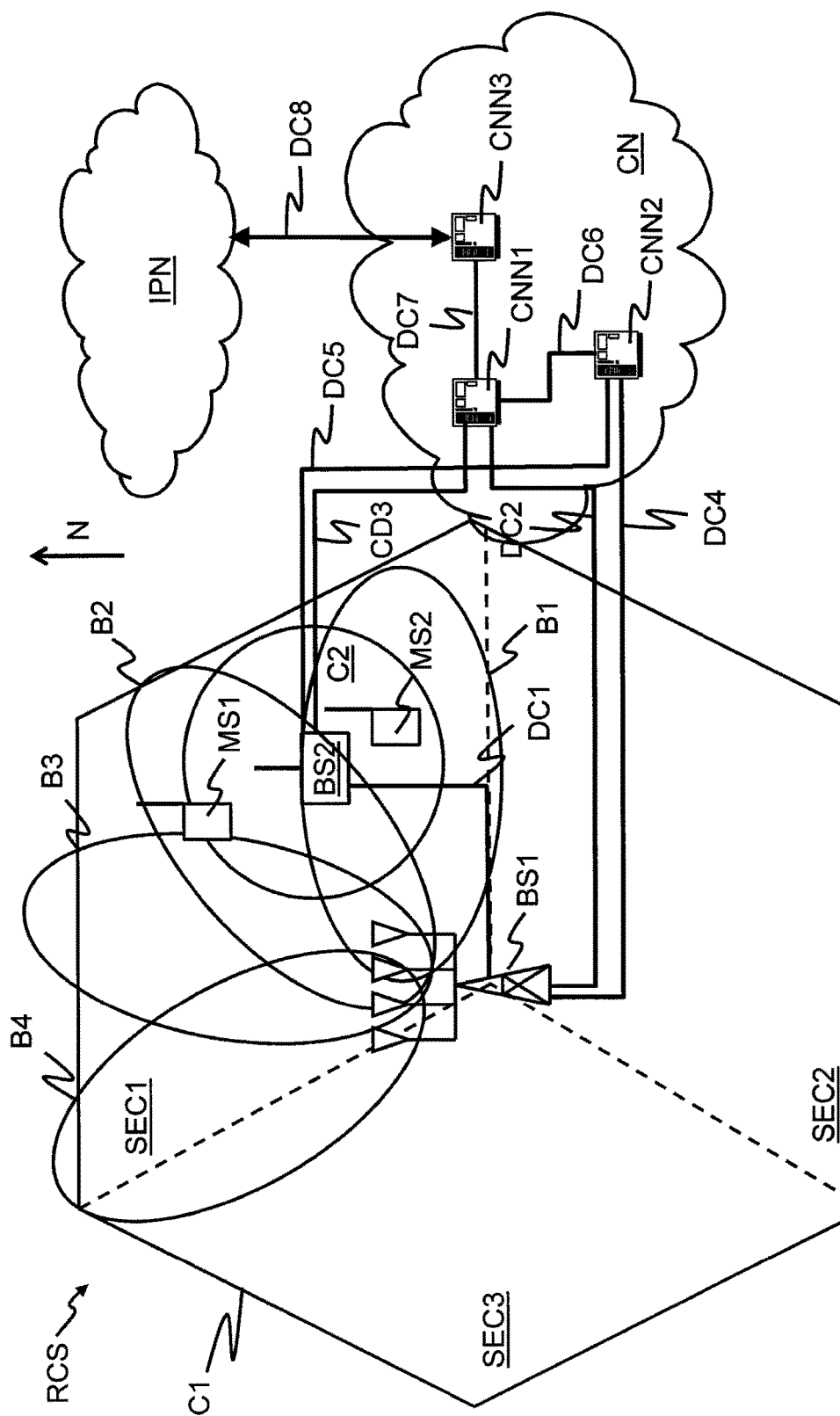
FIG. 1 shows a block diagram of an exemplary radio communication system according to the embodiments of the invention.

FIG. 1 shows an exemplarily radio communication system RCS, which contains two radio cells C1, C2. Further radio cells of the radio communication system RCS and a core network, which is connected to base stations BS1, BS2 of the two radio cells C1, C2 are not shown for simplification.

The term "base station" may be considered synonymous to and/or referred to as a base transceiver station, base station, Node B, enhanced Node B, access point etc. and may describe equipment that provides connectivity via a radio link between the radio communication system RCS and one or more mobile stations MS1, MS2.

The radio communication system RCS may be for example a 3GPP LTE radio communication system using OFDM (OFDM=Orthogonal Frequency Division Multiplexing). In further alternatives, the radio communication system RCS may be for example a WiMAX radio communication system (WiMAX=Worldwide Interoperability for Microwave Access) based for example on the IEEE 802.16d standard (IEEE=Institute of Electrical and Electronics Engineers), or a WLAN (WLAN) based for example on the IEEE 802.11g standard.

A first radio cell C1 of the two radio cells C1, C2 is provided by a first base station BS1, which may be for example a macro base station with a first maximum output power of e.g. 46 dBm for a 10 MHz carrier. A maximum size of the first radio cell C1 is determined by the first maximum output power, which is indicated in FIG. 1 by a border of a hexagon.

The first radio cell C1 may be sectorized for example into a first sector SEC1, a second sector SEC2, and a third sector SEC3. Only radiation beam coverage for the first sector SEC1 is shown for simplification. Exemplarily, the first sector SEC1 is covered by a group of four radiation beams B1, B2, B3 and B4 with different angles of radiation for example with respect to the magnetic North N. In further alternatives, the first sector SEC1 may be covered by a group of two radiation beams or by a group of more than four radiation beams.

The radiation beams B1, B2, B3 and B4 are based on so-called pre-coding vectors, which are predefined by a so-called transmit codebook and which is described for example in 3GPP TS 36.213 V10.0.1 (2010-12) section 7.2.4. This means a first pre-coding vector may represent a first radiation beam B1, a second pre-coding vector may represent a second radiation beam B2, a third pre-coding vector may represent a third radiation beam and a fourth pre-coding vector may represent a fourth radiation beam B4. Each pre-coding vector contains antenna weights with respect to amplitude and phase of the transmitted radio frequency signals for two or more antenna elements of the antenna system of the first base station BS1.

Similar radiation beam coverage may be provided by two further antenna systems of the first base station BS1 for the second sector SEC2 and the third sector SEC3.

A second base station BS2 is located within a coverage area of the first sector SEC1 and provides a second radio cell C2. The second base station BS2 provides a second maximum output power, which is for example 30 dBm for a 10 MHz carrier and therefore a factor 40 smaller than the first maximum output power. Due to the smaller second maximum output power, the second base station BS2 may be for example a micro base station, a pico base station or a femto base station. A maximum size of the second radio cell C2 is determined by the second maximum output power, which is also indicated in FIG. 1 by a border of the second radio cell C2. The second base station BS2 contains exemplarily an omni-directional antenna, so that the second radio cell C2 is not sectorized. Alternatively, the second base station BS2 may contain a single antenna system with two or more antenna elements for providing two or more radiation beams or may contain two or more antenna systems with two or more antenna elements for providing two or more radiation beams in a sectorized second radio cell.

According to a first alternative embodiment, which is not shown in FIG. 1, the first sector SEC1 of the first radio cell C1 and the second radio cell C2 intersect but the second radio cell C2 is not completely covered by the first sector SEC1.

According to a second alternative embodiment, which is also not shown in FIG. 1, the first base station BS1 and the second base station BS2 may be two base stations with a same maximum transmission output power and radiation beams of the first base station BS1 and the second base station BS2 may partly overlap.

A first mobile station MS1 is located within the first sector SEC1 and at a cell edge of the second radio cell C2. A second mobile station MS1 is located within the first sector SEC1 and within the second radio cell C2.

The term "mobile station" may be considered synonymous to, and may hereafter be occasionally referred to, as a mobile unit, mobile station, mobile user, access terminal, user equipment, subscriber, user, remote station etc. The mobile stations MS1, MS2 may be for example cellular telephones, portable computers, pocket computers, handheld computers, personal digital assistants, USB flash drives with a radio interface or car-mounted mobile devices.

The first base station BS1 and the second base station BS2 are interconnected by a first data connection DC1, which may be for example a so-called X2 interface as defined by 3GPP LTE and which may be a fixed connection or a radio connection. The first data connection DC1 is mainly used to support active-mode mobility (e.g. packet forwarding during handover) and multi-cell RRM functions (RRM=Radio Resource Management).

Due to a location of the second base station BS2 within the coverage area of the first sector SEC1, coverage areas of one or several of the radiation beams B1, B2, B3 and B4 overlap with a coverage area of the second radio cell C2. If a frequency reuse of 1 is applied within the radio communication system RCS (i.e. the first base station BS1 and the second base station BS2 apply a same frequency sub-carrier for downlink transmissions to the mobile stations MS1, MS2), the overlap of the coverage areas results into an interference of first downlink radio frequency signals, which are transmitted by the first base station BS1 to the mobile stations MS1, MS2 with second downlink radio frequency signals, which are transmitted by the second base station BS2. This interference disturbs a downlink radio communication from the second base station BS2 to the mobile stations MS1, MS2 and reduces an overall data throughput within the radio communication system RCS, if downlink transmissions from the first base station BS1 and the second base station BS2 to the mobile stations MS1, MS2 are not coordinated. For such a case, time-domain ICIC (ICIC=Inter-Cell Interference Coordination) may be applied on so-called almost blank subframes (ABS=almost blank subframe). Thereby, the first base station BS1 predefines one or several sub-frames of 1 ms length with a frame of 10 ms length, which the first base station BS1 will not use for scheduling mobile stations, which are connected to the first base station BS1. If different frequency sub-carriers are applied at the first base station BS1 and the second base station BS2, frequency-domain ICIC may be applied to avoid interferences between radio frequency signals, that are transmitted by the first base station BS1 and the second base station BS2 to the mobile stations MS1, MS2. The present invention will focus on a co-channel deployment with the time-domain ICIC, in which the first base station BS1 transmits first radio frequency signals in a downlink direction and the second base station BS2 transmits second radio frequency signals also in the downlink direction on one or several same frequency sub-carriers.

Figure 4:
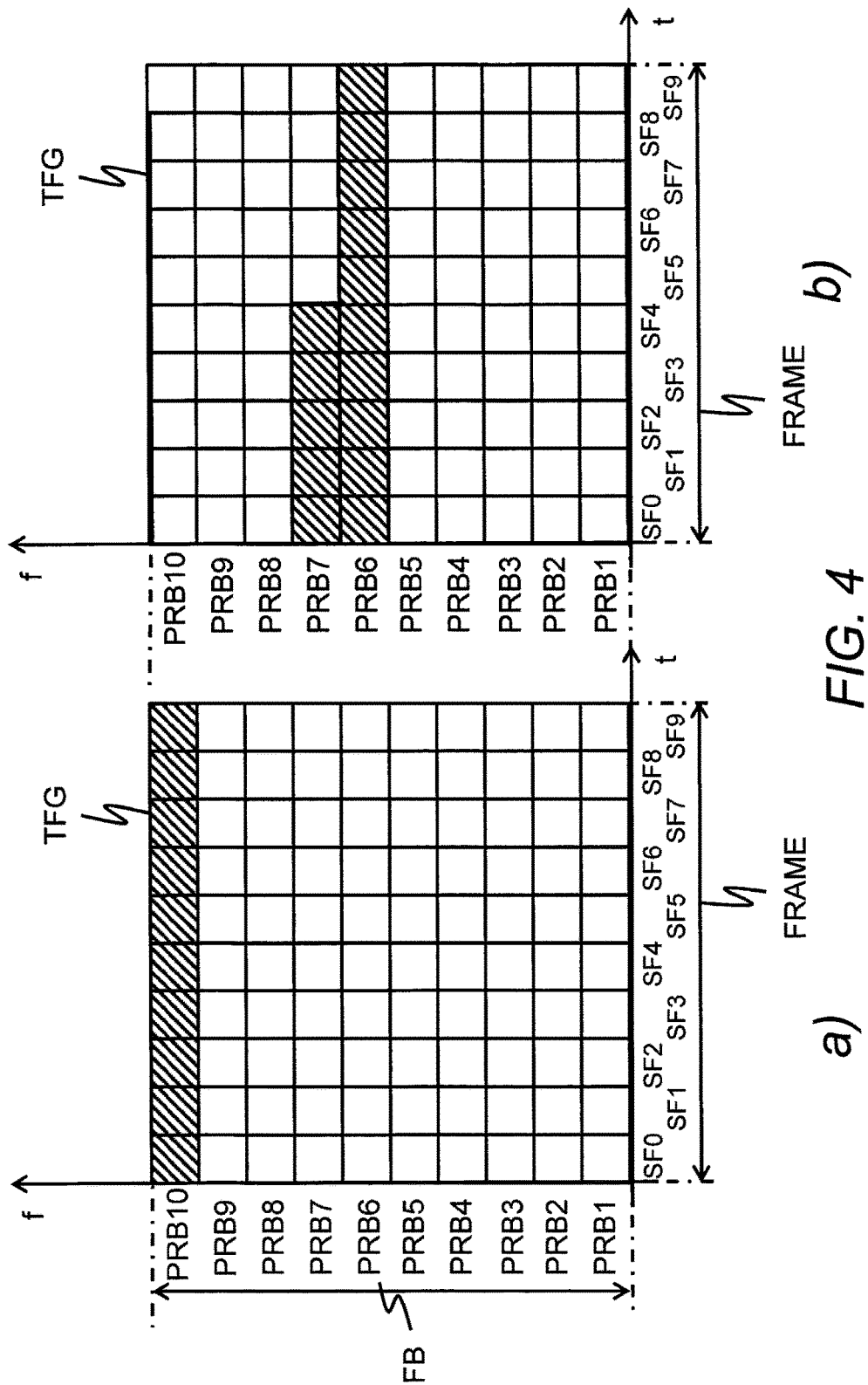
FIG. 4 shows two time frequency grids with two different allocations of radio resource blocks according to the embodiments of the invention.

A coordination of the downlink transmissions for reducing the interference is done in a following general way: In a first step, the first mobile station MS1 is used to detect an interfering radiation beam or several interfering radiations beams from the group of the four radiation beams B1, B2, B3 and B4, which provide significant interference to the coverage area of the second radio cell C2. A detection of the interfering radiation beam or the several interfering radiation beams may be based on common signalling procedures between the first base station BS1 and the first mobile station MS1 as defined for example by 3GPP LTE in 3GPP TS 36.213 V10.0.1 (2010-12) section 7.2. The first base station BS1 periodically transmits pilots via each of the radiation beams B1, B2, B3, and B4 by predefined resource blocks in a time frequency grid such as shown in FIG. 4 to the first mobile station MS1 and to the second mobile station MS2. With respect to FIG. 1, exemplarily the first mobile station MS1 is connected to the first base station BS1 and the second mobile station MS2 is connected to the second base station BS2. In future evolutions of 3GPP LTE, the first mobile station MS1 and the second mobile station MS2 may be also connected via two or more radio connections to two or more base stations at a same time.

After receiving the pilots, the first mobile station MS1 periodically determines signal qualities of the received pilots, determine a radiation beam with a maximum signal quality or several radiation beams with a signal quality equal to or above a predefined signal quality and transmit an indication of the radiation beam with the maximum signal quality or several indications for the several radiation beams with a signal quality equal to or above the predefined signal quality to the first base station BS1. Regarding FIG. 1, the first mobile station MS1 may transmit an indication for the second radiation beam B2. The first base station BS1 identifies the interfering radiation beam or the several interfering radiation beams based on the received indication or the several received indications, when the indication or the several indications have been received on a condition, that the first mobile station MS1 is located at a border of or within the coverage area of the second radio cell C2.

In a second step, one or several radio resources of the detected single interfering radiation beam or the several interfering radiation beams will not be used by the first base station BS1 for the single interfering radiation beam or the several interfering radiation beams. Instead, the first base station BS1 might serve mobile stations, which are connected to the first base station BS1 and which are located within the single interfering radiation beam or within one of the several interfering radiation beams with a further non interfering radiation beam, which is not indicated as a best PMI but which provides no or only few interference to the coverage area of the second radio cell C2. The one or several radio resources are applied by the second base station BS2 for serving mobile stations, which are located within the single radiation beam or one of the several radiation beams and which are connected to the second base station BS2.

Figure 2:
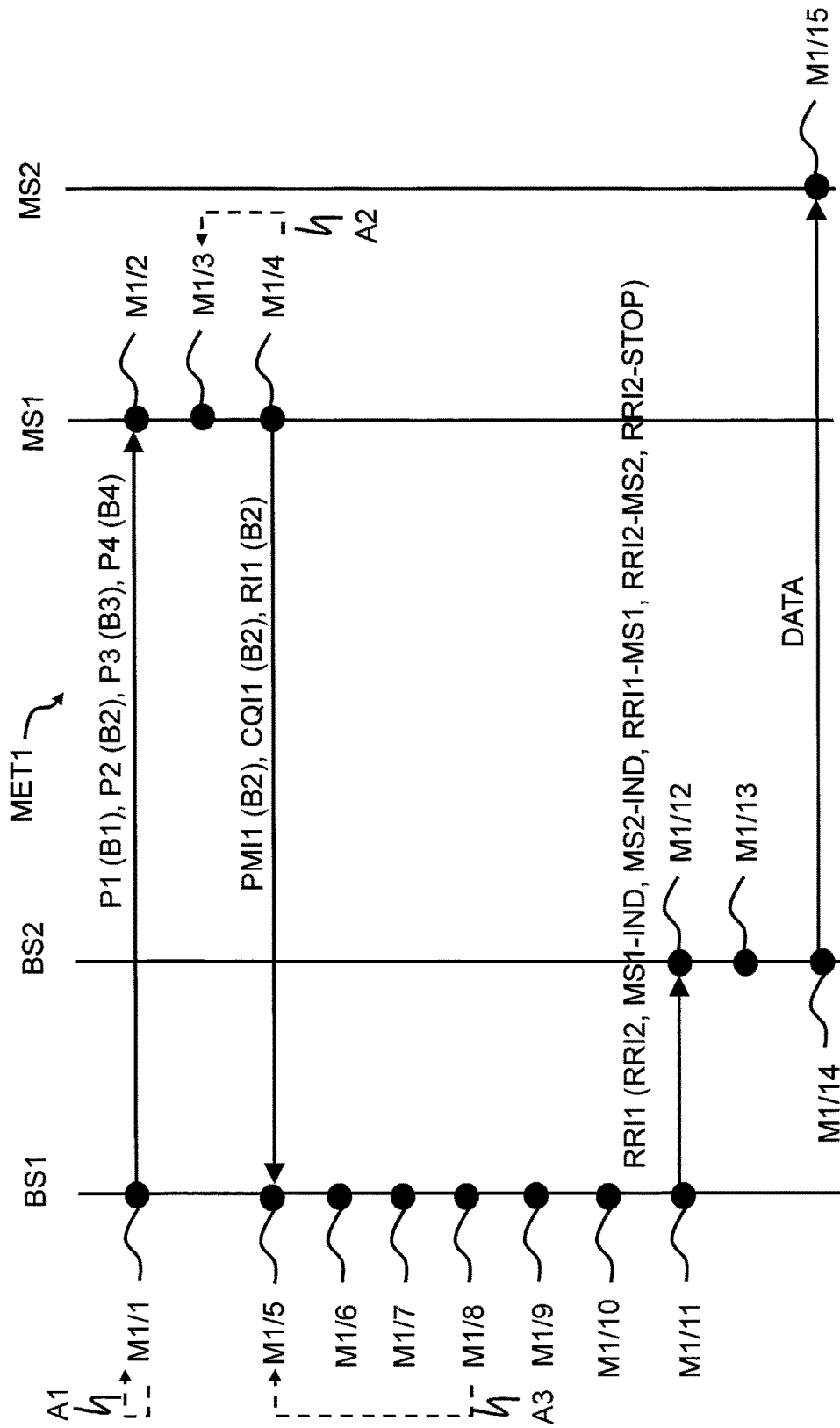
FIG. 2 shows a flow diagram of a method according to the embodiments of the invention.

The coordination of the downlink transmissions from the base stations BS1, BS2 for interference reduction in the radio communication system RCS is explained in more detail with respect to FIGS. 2 and 4.

Referring to FIG. 2 a flow diagram of a first method MET1 in accordance to the embodiments of the invention is shown. The number of the steps for performing the first method MET1 is not critical, and as can be understood by those skilled in the art, that the number of the steps and the order of the steps may vary without departing from the scope of the invention.

The first mobile station MS1 may be connected to and served by the first base station BS1 and the second mobile station MS2 may be connected to and served by the second base station BS2.

In a first periodical step M1/1 (indicated by a first arrow A1 in FIG. 2), the first base station BS1 may transmit in a non-directional way predefined so-called common pilots P to the first mobile station MS1 by applying predefined radio resource locations for the common pilots P within a time frequency grid. Such a pilot transmission is described for example in case of 3GPP LTE in 3GPP TS 36.211 V10.0.0 (2010-12) section 6.10, where the common pilots are called Cell-specific reference signals.

In a further step M1/3, the first mobile station MS1 performs an evaluation on the received common pilots P for determining a radiation beam, which fulfils a predefined quality criterion. Such an evaluation is for example described in EP 2 166 807 B1. Thereby, the first mobile station MS1 applies a first precoding vector from the transmit codebook to calculate a first SNR, SINR or SIR value for one of the received common pilots or for several of the received common pilots using an averaging and applies at least a second precoding vector from the transmit codebook to calculate at least one second SNR, SINR or SIR value for the one of the received common pilots or for the several of the received common pilots using the averaging. The predefined quality criterion may be for example a largest SNR, a largest SINR or a largest of the calculated first and second SNR, SINR or SIR values. The predefined quality criterion may be alternatively a group of two or more radiation beams with a largest SNR, a largest SINR or a largest SIR, if the first mobile station MS1 is configured to report more than one PMI. A number of reported PMIs may depend on a predefined received signal quality threshold and on a number of received signal quality values for the various radiation beams B1, B2, B3, B4 that reach or exceed the predefined signal quality threshold. With respect to FIG. 1, the first mobile station MS1 may determine a first PMI PMI1, which indicates the second radiation beam B2 as a best PMI for the first mobile station MS1. The first mobile station MS1 may preferably further determine by the step M1/3 a first CQI CQI1 and a first RI RI1 for the second radiation beam B2.

In a further step M1/4, the first mobile station MS1 transmits the first PMI PMI1, the first CQI CQI1 and the first RI RI1 to the first base station BS1, which is received by the first base station BS1 in a next step M1/5.

The evaluation and the transmission, which are executed by the steps M1/3, M1/4 and M1/5 may be performed with a same periodicity as the transmission of the common pilots P or may be repeated based on averaging a signal quality of two or more of the received common pilots P (the repetition of the steps M1/3, M1/4 and M1/5 is indicated by a second arrow A2 in FIG. 1).

Figure 3:
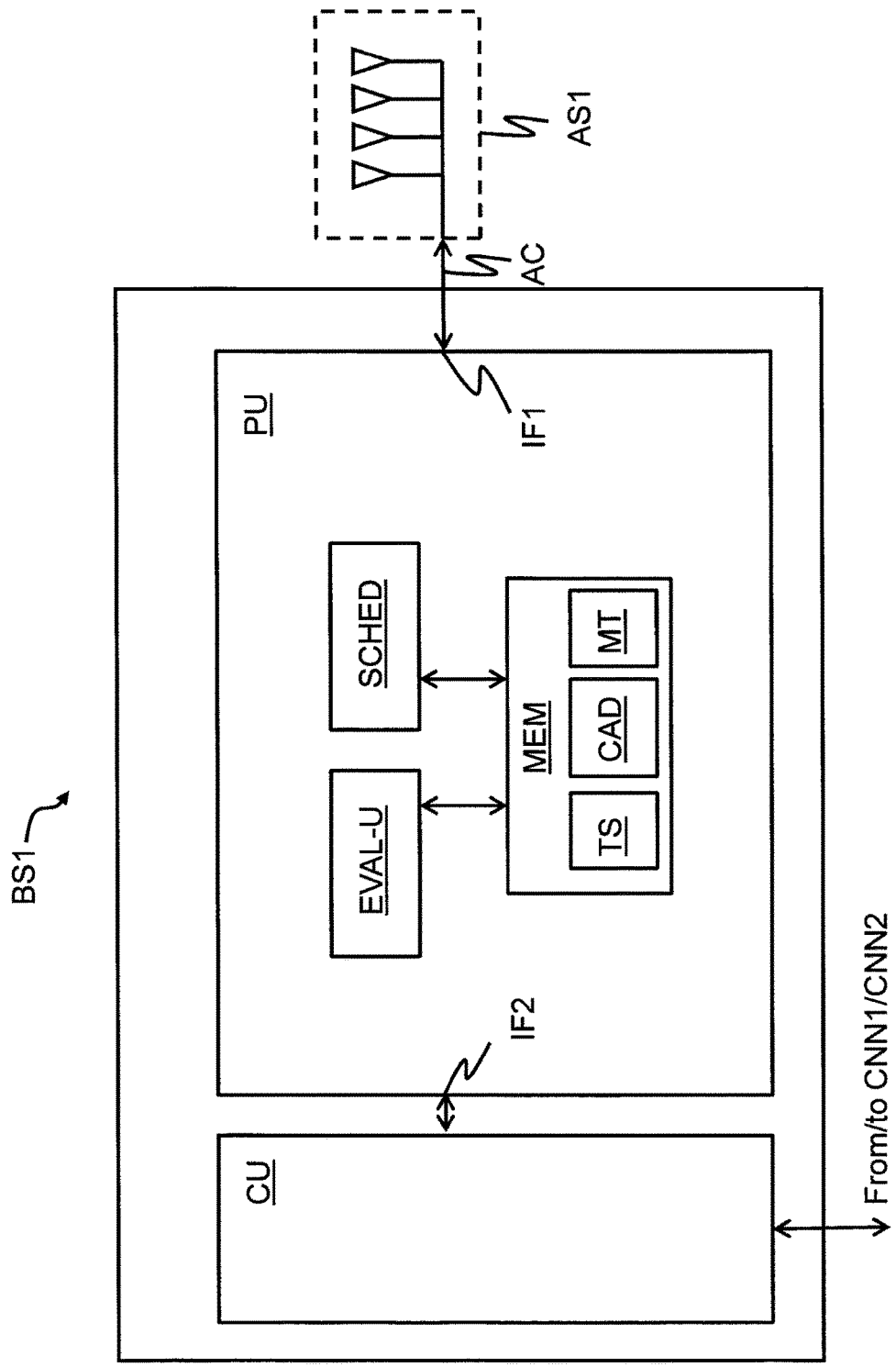
FIG. 3 shows a block diagram of a wireless access network node according to the embodiments of the invention.

Further steps M1/6 to M1/11 may be executed by a processing unit PU of the first base station BS1, which is schematically depicted in FIG. 3. The first base station BS1 contains an antenna system AS1 for the first sector SEC1. The antenna system AS1 exemplarily contains four antenna elements for enabling beamforming at the antenna system AS1. The first base station BS1 further contains a processing unit PU and a control unit board CU. The processing unit PU may be for example a wireless transceiver or a wireless transmitter for radio frequency signals. Alternatively, the processing unit PU may be a so-called modem unit board, if one RRH (RRH=remote radio head) or several RRHs are applied instead of the antenna system AS1.

The processing unit PU contains a first interface IF1, which is connected by an antenna connection AC to the antenna system AS1. In case of using one RRH or several RRHs, the antenna connection may be based for example on a so-called CIPRI interface (CIPRI=Common Public Radio Interface). The processing unit PU further contains a second interface IF2 for a connection to the control unit board CU.

The control unit board CU performs tasks on layer 3, i.e. on a so-called RRC layer (RRC=Radio Resource Control) such as measurements, cell reselection, handover, RRC security and integrity. The control unit board CU is connected to one or several network nodes of the core network and transmits IP data, which have been received from the core network, to the processing unit PU for further processing. The control unit board CU is further connected to a further control unit board in the second base station BS2 via the first data connection DC1.

The processing unit PU contains several functional blocks such as a scheduler SCHED, an evaluation unit EVAL-U and a memory MEM. The memory MEM may contain a temporary storage TS and a mapping table MT. The processing unit PU generally performs data processing on layer 2, i.e. on a so-called PDCP layer (PDCP=Packet Data Convergence Protocol), which is responsible for header compression and ciphering, on a so-called RLC layer (RLC=Radio Link Control), which is e.g. responsible for segmentation and ARQ (ARQ=Automatic Repeat Request), and on a so-called MAC layer (MAC=Media Access Control), which is responsible for MAC multiplexing and HARQ (HARQ=Hybrid Automatic Repeat Request). The processing unit PU generally further performs data processing on the physical layer in the downlink direction such as coding, modulation and antenna and resource block mapping. The number of the functional blocks of the first base station BS1 and the processing unit PU is not critical, and as can be understood by those skilled in the art, that the number of the functional blocks depends on individual implementation preferences and therefore may vary without departing from the scope of the invention.

In a further step M1/6, the processing unit PU receives the first PMI PMI1 and may store the first PMI PMI1, an identifier of the first mobile station MS1 in a temporary storage TS of the memory MEM and preferably may also store a timestamp of a point of time, when the first PMI PMI1 have been stored to the temporary storage TS. The identifier of the first mobile station MS1 may be provided for example by the scheduler SCHED. Data, which are stored to the temporary storage TS may be deleted automatically after a predefined time or oldest data may be overwritten with newest data, if the temporary storage TS is completely filled with data.

In a next step M1/7, the evaluation unit EVAL-U performs one or several evaluations to decide, whether the received first PMI PMI1 shall be stored to the mapping table MT in a further step M1/8. The evaluation unit EVAL-U evaluates primarily, whether the first PMI PMI1 is received at a point of time, when the first mobile station MS1 is located within an overlapping coverage area of the second radiation beam B2 and the second radio cell C2. Such an evaluation may be performed in different ways:

According to a first alternative, dimensions of overlapping coverage areas such as the overlapping coverage area of the second radiation beam B2 and the second radio cell C2 may be known from software used for planning the radio communication system RCS and the dimensions may be stored in a coverage area database CAD of the memory MEM for example in a form of geographical coordinates of a border of the overlapping coverage area. Current geographical coordinates of the first mobile station MS1 at the point of time, when the first mobile station MS1 has transmitted the first PMI PMI1, may be determined for example by well-known location methods such as triangulation or propagation time measurement of radio frequency signals, which are transmitted from the first mobile station MS1 to two or more antenna systems of the radio communication system RCS. Such location methods are described for example in "Wireless Position Location: Fundamentals, Implementation Strategies, and Sources of Error", Kevin J. Krizman et al., IEEE 47th Vehicular Technology Conference Proceedings, 919 (1997) or in "Satellite and Terrestrial Radio Positioning Techniques, A signal processing perspective", Dardari, Luise, Falletti, Academic Press, 2011. The evaluation unit EVAL-U queries the coverage area database CAD and verifies, whether the determined coordinates of the first mobile station MS1 are within the geographical border coordinates of the overlapping coverage area.

According to a second alternative, current geographical coordinates of the first mobile station MS1 at the point of time, when the first mobile station MS1 has transmitted the first PMI PMI1, may be determined for example by the first mobile station M51, which contains a receiver for radio frequency signals from a space-based satellite navigation system such as GPS (GPS=Global Positioning System), Galileo or Glonass. The first mobile station MS1 may transmit the current geographical coordinates for example together with the first PMI PMI1 to the first base station BS1. Then, in a same way as applied for the first alternative, the evaluation unit EVAL-U may verify, whether the current coordinates of the first mobile station MS1, which are received from the first mobile station MS1, are within the geographical border coordinates of the overlapping coverage area.

Preferably according to various third alternatives, the evaluation unit EVAL-U controls, whether the first PMI PMI1 has been received shortly before or after a handover of the first mobile station MS1 between the first base station BS1 and the second base station BS2. This control may be based on monitoring at the evaluation unit EVAL-U a reception of handover event messages from the control unit board CU. The reception of a handover event message is not shown in FIG. 2 for simplification. The handover event message may contain for example the identifier of a mobile station, which performs the handover and an indication of a radio cell to which or from which the handover is performed.

With respect to FIG. 1, in case of a handover from the first sector SEC1 to the second radio cell C2, the evaluation unit EVAL-U deletes the first PMI PMI1 and the identifier of the first mobile station MS1 in the memory MEM, if no handover event message is received for the first mobile station MS1 performing the handover from the first sector SEC1 to the second radio cell C2 before a further first PMI PMI1 is received from the first mobile station MS1 or the evaluation unit EVAL-U may keep the first PMI PMI1 in the temporary storage TS for applying one or several statistical mathematical methods at a later point of time. This means, that a single PMI, which have been received in correlation to a handover of the first mobile stations from the first base station BS1 to the second base station BS2, may not define or determine a radiation beam of the first base station BS1 as an interfering radiation beam for the second base station BS2.

In case of a handover of the first mobile station MS1 from the second base station BS2 to the first base station BS1, the evaluation unit EVAL-U evaluates in the step M1/7, whether a handover event message from the control unit board CU has been received at the processing unit PU before the first PMI PMI1 from the first mobile station MS1 is received in the step M1/6. If the handover event message has been received preferably within a first predefined time frame or a first predefined time period such as 70 ms before the step M1/6, the evaluation unit EVAL-U keeps the first PMI PMI1 in the temporary storage TS and may also store the indication of the second base station BS2 or of the second radio cell C2 for the first PMI PMI1 in the temporary storage TS. If no handover event message has been received within the first predefined time frame before the step M1/6, the evaluation unit EVAL-U may delete in the first PMI PMI1 in the temporary storage TS.

Preferably, the evaluation unit EVAL-U starts a timer with the first predefined time period at the point of time, when the first PMI PMI1 and the identifier of the first mobile station MS1 are stored in the temporary storage TS of the memory MEM and the evaluation unit EVAL-U deletes the first PMI PMI1 and the identifier of the first mobile station MS1 in the temporary storage TS, if no handover event message is received for the first mobile station MS1 performing a handover from the first sector SEC1 to the second radio cell C2 before the first predefined time frame has expired or the evaluation unit EVAL-U keeps the first PMI PMI1 in the temporary storage TS, if a handover event message for the first mobile station MS1 performing a handover from the first base station BS1 to the second base station BS2 is received before the first predefined time frame has expired. If a timer is used and the first predefined time period is set to an adequate value, it is possible to control more precisely, that the first mobile station MS1 is located with the overlapping coverage area of the first sector SEC1 and the second radio cell C2 especially if a transmission period for transmitting PMIs from the first mobile station MS1 to the first base station BS1 is large and also a speed of the first mobile station MS1 is large.

In a similar way for a handover of the first mobile station MS1 from the second base station BS2 to the first base station BS1, the evaluation unit EVAL-U may receive a handover event message for the first mobile station MS1 performing a handover from the second base station BS2 to the first base station BS1 and may store the identifier of the first mobile station MS1 and the indication of the second radio cell C2 in the temporary storage TS of the memory MEM (not shown in FIG. 2 for simplification). The evaluation unit EVAL-U keeps the first PMI PMI1 in the temporary storage TS, if the first PMI PMI1 is received from the first mobile station MS1 after the handover.

In a next sub-step, the evaluation unit EVAL-U may verify, whether a number of PMIs stored in the temporary storage TS is equal to or above a predefined number of PMIs. If the number of PMIs stored in the temporary storage TS is below the predefined number of PMIs, the next step may be the step M1/5. If the number of PMIs stored in the temporary storage TS is equal to or above the predefined number of PMIs, the evaluation unit EVAL-U may perform one or several statistical evaluation methods as described in the following. The statistical evaluation methods may be performed under the assumption, that radiation beams of the first base station BS1 are steady for a longer time period and are not changed on a short time scale such as milliseconds or seconds.

The evaluation unit EVAL-U may for example determine, whether the second radiation beam B2 has been reported by mobile stations within a first predefined time frame $\Delta T1$ with a predefined frequency of occurrence. The first predefined time frame $\Delta T1$ may be for example one or several minutes or hours. Therefore, the evaluation unit EVAL-U may determine a frequency of occurrence of the second radiation beam B2, which has been reported to the first base station BS1 by the first PMI PMI1 and with respect to handovers of mobile stations from the first base station BS1 to the second base station BS2 within a time window TW, that is given for example by $TW=(t_0-\Delta T1, t_0)$ with $t_0$ as the time stamp, when a first PMI has been received at the processing unit PU from the first mobile station MS1. Based on calculating frequencies for each reported radiation beam, the evaluation unit EVAL-U may for example determine the PMI for the second radiation beam B2, if the PMI for the second radiation beam B2 has a largest frequency of occurrence within the time window TW of all PMIs that are stored in the temporary storage TS.

Alternatively, the evaluation unit EVAL-U may for example determine the PMI for the second radiation beam B2 as a reliable interfering radiation beam, if the PMI for the second radiation beam B2 has been reported equal to or above a first predefined frequency of occurrence by the mobile stations within the predefined time frame $\Delta T$, which perform a handover from the first base station BS1 to the second base station BS2, based on following equation (a similar equation may be applied for a handover from the second base station BS2 to the first base station BS1):

$$\frac{N_{B2}}{N_{TOTAL}} > RT[\%]$$

With:
$N_{B2}$=number of handovers for which the second radiation beam B2 has been reported as last or first PMI
$N_{TOTAL}$=total number of handovers for which radiation beams of the first base station BS1 have been reported as last or first PMI
RT=first predefined frequency of occurrence in percent. The first predefined frequency of occurrence may be for example 30 percent.

Figure 5:
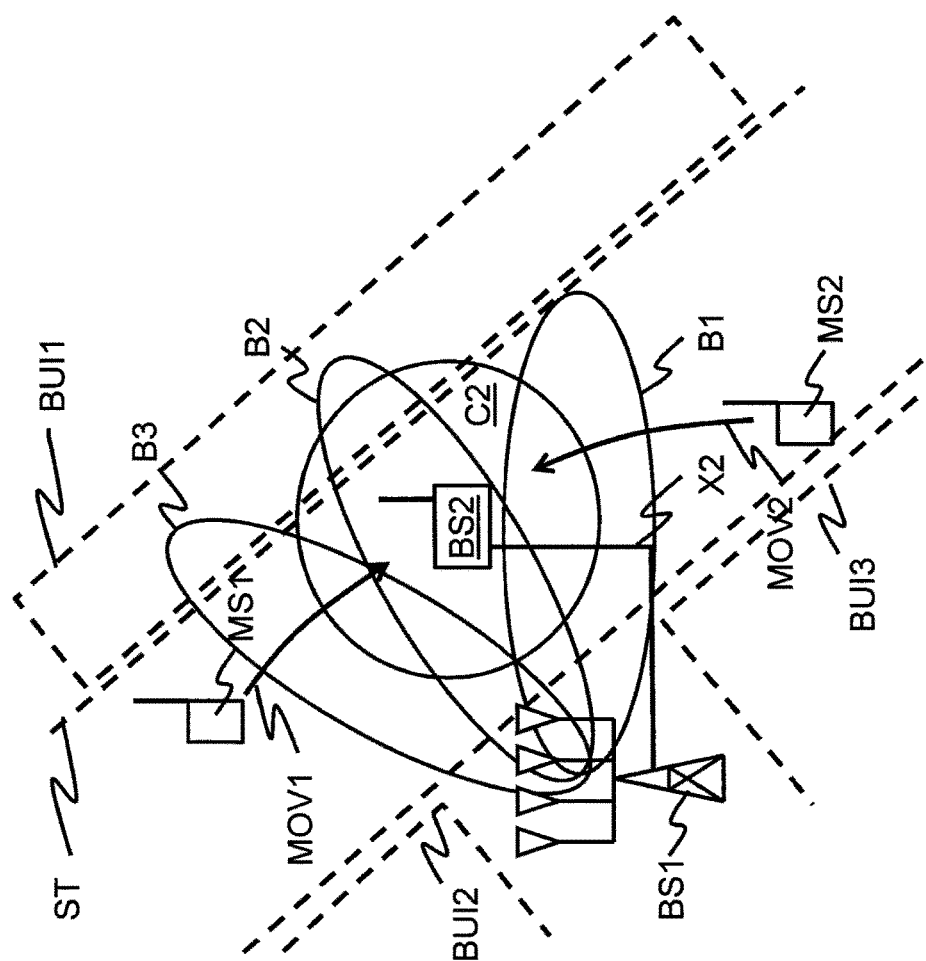
FIG. 5 shows a block diagram of a first base station and a second base station according to an embodiment of the invention.

In the step M1/7, the evaluation unit EVAL-U may preferably also evaluate, whether with respect to the first PMI PMI1 and with respect to the second radio cell C2 a further PMI for a non-adjacent radiation beam is already stored in the mapping table MT. Depending on local structural conditions, it may be the case, that the mobile stations MS1, MS2 always cross the second radio cell C2 in a same direction or in opposite directions MOV1, MOV2 as shown for example in FIG. 5. A street ST and buildings BUI1, BUI2, BUI3 along the street ST may allow the mobile stations MS1, M52 only to move along the street ST. Thereby, handovers from the first base station BS1 to the second base station BS2, when the mobile stations are located with a coverage area of the first radiation beam B1 or the third radiation beam B3 or handovers from the second base station BS2 to the first base station BS1, when the mobile stations are located with a coverage area of the first radiation beam B1 or the third radiation beam B3 may occur, but no handovers from the first base station BS1 to the second base station BS2, when the mobile stations are located within a coverage area of the second radiation beam B2 and no handovers from the second base station BS2 to the first base station BS1, when the mobile stations are located within the coverage area of the second radiation beam B2 may occur. In such a case, a PMI for the second radiation beam B2 will never be reported from the mobile stations MS1, MS2 to the first base station BS1 before or after a handover of the mobile stations MS1, MS2 although the second radiation beam B2 may be a strong interfering radiation beam for the second radio cell C2. If for example the second mobile station MS2 already has moved from the first sector SEC1 via the first radiation beam B1 into the coverage area of the second radio cell C2 and a handover from the first base station BS1 to the second base station BS2 has been performed, a PMI for the first radiation beam B1 may be already stored with respect to the second radio cell C2 in the mapping table MT. If now the first mobile station MS1 moves from the first sector SEC1 via the third radiation beam B3 also into the coverage area of the second radio cell C2 and also performs handover from the first base station BS1 to the second base station BS2, the first mobile station MS1 may transmit before the handover as a last PMI, a PMI for the third radiation beam B3 to the first base station BS1. The evaluation unit EVAL-U may query the mapping table MT for a PMI of a radiation beam with respect to the second radio cell C2, which indicates a radiation beam that is non-adjacent to the third radiation beam B3. Regarding the example of FIG. 5, the query will provide the PMI of the first radiation beam B1. The evaluation unit EVAL-U may know, that the second radiation beam B2 provides coverage for an area, which is located between coverage areas of the first radiation beam B1 and the third radiation beam B3. Therefore, the already stored PMI for the first radiation beam B1 and the newly received PMI for the third radiation beam B3 both with respect to the second radio cell C2 provide a reliable indication, that also the second radiation beam B2 must be an interfering radiation beam with respect to the second radio cell C2. Thus, the evaluation unit EVAL-U may store the PMIs for the first radiation beam B1 and the second radiation beam B2 to the mapping table MT as interfering radiation beams for the second radio cell C2.

In the step M1/7 according to a further embodiment, the evaluation unit EVAL-U may further evaluate, whether the first mobile station MS1 is a fast or slow mobile station. The radio communication system RCS may be configured in such a way, that mobile stations, which move with a speed that is equal to or exceeds a predefined speed values such as 30 km/h, will be served by macro base stations and not by micro base stations, pico base stations or femto base stations. ICIC with ABS may be applied by the second base station BS2 while the first mobile station MS1 is scheduled by the first base station BS1 and passes the second radio cell C2, so that the second radio frequency signals, which are transmitted from the second base station BS2 to mobile stations, which are scheduled by the second base station BS2 don't provide interference to the first radio frequency signals, which are transmitted from the first base station BS1 to the first mobile station MS1. This means that for such mobile stations a handover between the first base station BS1 and the second base station BS is prevented and not executed and therefore a PMI is never received in correlation to a handover between the first base station BS1 and the second base station BS2. In such a case, a speed and a location of a fast moving mobile station with a speed above the predefined speed value may be determined by using one of the location methods (triangulation, propagation time measurement, using a receiver for receiving signals from a global navigation satellite system) as described above. An indication for the location of the fast moving mobile station within the second radio cell C2 may be also obtained from measuring at the first mobile station MS1 and reporting by the first mobile station MS1 a second RSRP (RSRP=Reference Signal Received Power such as defined by 3GPP LTE, see 3GPP TS 36.214 V10.1.0 section 5.1.1) for the second radio cell C2 with a second value being larger than a first value from measuring a first RSRP for the first sector SEC1. The first mobile station MS1 may be classified as a fast mobile station with a speed above the predefined speed value by measuring for example a handover rote with a number N of handovers per time frame Δt and by determining, whether the handover rate exceeds a predefined handover rate threshold $N_{thres}$ by using for example following equation:

$$\frac{N}{\Delta N} \geq N_{thres}$$

If for example the evaluation unit EVAL-U has determined, that the first mobile station MS1 (see FIG. 5) moves with a speed above the predefined speed value, the evaluation unit EVAL-U compares the location of the first mobile station MS1 with the coverage area of the second radio cell C2. If for example the PMI for the second radiation beam B2 has been received from the first mobile station MS1, when the first mobile station MS1 is located within the coverage area of the second radio cell C2, the evaluation unit EVAL-U may identify the second radiation beam B2 as an interfering radiation beam for the second radio cell C2.

In a further step M1/8, the evaluation unit EVAL-U stores the first PMI PMI1, if one of the statistical evaluation methods, which have been described above has determined the first PMI PMI1 as a reliable PMI for indicating the second radiation B2 as an interfering radiation beam for the second radio cell C2.

In addition, the evaluation unit EVAL-U may store the indication of the second base station BS2 or of the second radio cell C2 for the first PMI PMI1 in the mopping table MT, if two or more micro cells, pico cells of femto cells are located within the first sector SEC1 or intersect with the first sector SEC1 and if a PMI for the second base station BS2 or of the second radio cell C2 has not yet been stored in the mapping table MT. In such a case the mapping table MT will be changed as shown in the following two tables:

| Identifier of radio cell | PMIs | | Identifier of radio cell | PMIs |
|---|---|---|---|---|
| | | → | C2 | B1 |

If for example, the second mobile station MS2 has already transmitted a second PMI for the first radiation beam B1 immediately before the second mobile station MS2 has performed a handover from the first sector SEC1 to the second radio cell C2 and now the handover event message indicates a handover of the first mobile station MS1 to the second radio cell C2 the mapping table will be changed as shown in the following two further tables:

| Identifier of radio cell | PMIs | | Identifier of radio cell | PMIs |
|---|---|---|---|---|
| C2 | B2 | → | C2 | B2, B1 |

Only those PMIs may be stored in the mapping table MT for a specific radio cell, which are not yet stored in the mapping table MT. Preferably, in addition a time stamp for a point of time, when the first PMI PMI1 is stored in the mapping table MT may be stored in the mapping table MT. The time stamp may be used to perform after a predefined time period a further statistical analysis, whether the first PMI PMI1 is still a reliable indication, that the second radiation beam B2 is still an interfering radiation beam for the second radio cell C2. If not, the first PMI PMI1 may be deleted from the mapping table MT.

Similarly as described above for the handover from the first base station BS1 to the second base station BS2, the execution of the step M1/8 for the first PMI PMI1 of the second radiation beam B2, may depend on a second frequency of occurrence for reporting the second radiation beam B2 by mobile stations within the predefined time frame ΔT, which execute a handover from the second base station BS2 to the first base station BS1. In a further alternative, the execution of the step M1/8 for the first PMI PMI1 of the second radiation beam B2, may depend on a third frequency of occurrence for reporting the second radiation beam B2 by mobile stations within the predefined time frame ΔT, which execute handovers in one of both handover directions: from the first base station BS1 to the second base station BS2 and from the second base station BS2 to the first base station BS1.

The next step after the step M1/8 may be the step M1/5 (indicated by a fourth arrow A4 in FIG. 1).

In a further step M1/9, which may be periodically triggered for example by an expiry of a periodic timer or which may be trigger, if the mapping table MT has been changed, the scheduler SCHED queries the mapping table MT for any changes of stored PMIs with respect to the second radio cell C2 and with respect to a last query.

In a next step M1/10, if a PMI has been newly stored in the mapping table MT for the second radio cell C2 such as the first PMI PMI1 for the second radiation beam B2, the scheduler SCHED determines first radio resources for example in a time frequency grid, which will be blocked at the first base station BS1 for following transmissions by the first base station BS2 via the second radiation beam B2. An example for such a time frequency grid TFG is shown in FIG. 4. A resource distribution is shown in FIG. 4a) for a predefined time length FRAME, which may be for example a frame of 10 ms as applied in 3GPP LTE. A frequency bandwidth FB may be in case of 3GPP LTE for example 1.4 MHz, 3 MHz, 5 MHz, 10 MHz, 15 MHz or 20 MHz. The time frequency grid is split in case of 3GPP LTE into PRBs (PRB=Physical Resource Block) of a frequency width of 180 kHz and a time length of 1 ms. In FIG. 4a) ten adjacent PRBs PRB1, PRB2, PRB3, PRB4, PRB5, PRB6, PRB7, PRB8, PRB9, PRB10 are shown exemplarily. The frame is split into 10 sub-frames SF0, SF1, SF2, SF3, SF4, SF5, SF6, SF7, SF8, SF9 with the time length of 1 ms. With respect to FIG. 4a) the first radio resources, which are determined exemplarily by the scheduler SCHED are all sub-frames of PRB10. Alternatively, the scheduler SCHED may determine as the first radio resources for example all sub-frames of PRB6 and sub-frames SF0 to SF4 of PRB7 (shown in FIG. 4b)).

In a further alternative, the first radio resources are not blocked at the first base station BS1 for following transmissions by the first base station BS2 but a transmission power, which is applied at the first base station BS1 for the first radio resources of the second radiation beam B2 is limited for the following transmissions for example to a predefined transmission power, which may be for example 1/40 of the first maximum output power. In such case, the first maximum output power of the first base station BS1 is limited to the second maximum output power of the second base station BS2.

Preferably, restrictions for the first radio resources (e.g. applying for the first radio resources a transmission power equal to or below the predefined transmission power; blocking the first radio resources) may be only applied for the second radiation beam B2, which has an overlapping coverage area with the second radio cell C2. For other radiation beams of the first base station BS1 such as the third radiation beam B3 or the fourth radiation beam B4, which have no overlapping coverage with the second radio cell C2 no such restrictions may be applied. Thereby, downlink transmissions from the first base station BS1 to mobile stations, which are served by the first base station BS1 are not impacted too much and a reduction of an overall data throughput at the first base station BS1 is kept low.

It may also happen, that for a radiation beam, which is already stored in the mapping table MT no further indications will be received from any mobile stations within a second predefined time frame ΔT2 or the further indication will not be received from the mobile stations within the second predefined time frame ΔT2 with a predefined second frequency of occurrence, which may be lower than the first predefined frequency of occurrence. If for example a point of time $t_1$ for receiving no further indications, which may be given by $t_1=t_2-\Delta T2$ with $t_2$: point of time of executing the step M1/9, is later than the point of time, when the first PMI PMI1 has been stored in the mapping table MT, the PMI for the radiation beam may be deleted from the mapping table MT in the step M1/10.

In a next step M1/11, the scheduler SCHED transmits a first indication or several first indications RRI1 for the first radio resources to the second base station BS2 via the first data connection DC1 and the second base station BS2 receives the first indication or the several first indications RRI1 in a further step M1/12. The first indication or the several first indications RRI1 may be transmitted from the first base station BS1 to the second base station BS2 for example by using proprietary messages on the X2 interface. If all sub-frames of a PRB are selected by the scheduler SCHED such as shown in FIG. 4a) only an indication for PRB10 may be transmitted to the second base station BS2. In case of FIG. 4b) an indication for PRB6 and an indication of PRB7 followed by an indication for SF0 and the number 4 may be transmitted to the second base station BS2. In such a case, PRB7, SF0 and the number 4 indicate, that sub-frame SF0 and following 4 sub-frames SF1 to SF4 of PRB7 are determined in addition to all sub-frames of PRB6. Alternatively, the first base station BS1 may transmit in addition an indication to the second base station BS2, whether a use of the first radio resources is blocked at the first base station BS1 or only a transmission power for the first radio resources is limited at the first base station BS1.

According to a further embodiment, which is also shown in FIG. 1, a coverage area of the first radiation beam B1 and a coverage area of the second radiation beam B2 may overlap with the coverage area of the second radio cell C2. The first mobile station MS1 may be located within an overlapping coverage area of the second radiation beam B2 and the second radio cell C2 and the second mobile station MS2 may be located within an overlapping coverage area of the first radiation beam B1 and the second radio cell C2. Locations of the first mobile station MS1 and the second mobile station MS2 may be determined by one of the methods (e.g. triangulation, propagation time measurement, using a GPS receiver) as described above. If mobile stations are located within different overlapping coverage areas of the radiation beams of the first base station BS1 and the coverage area of the second radio cell C2, the scheduler SCHED may determine in the step M1/10 the first radio resources for the second radio beam B2 and may determine for the first radiation beam B1 second radio resources, which don't overlap with the first radio resources and which shall be unused by the first base station BS1 or shall be transmitted by the first base station BS1 for the first radiation beam B1 with a transmission power equal to or below the predefined transmission power. With respect to FIG. 4a), the second radio resources may be for example all sub-frames of PRB6. In the step M1/11, the scheduler SCHED may transmit to the second base station BS2 the first indication or the several first indications RRI1 for the first radio resources and a second indication or several second indications RRI2 for the second radio resources. If the first mobile station MS1 and the second mobile station MS2 may reside for a longer time period such as minutes or hours or days within the coverage areas of the first radiation beam B1 and the second radiation beam B2, the scheduler SCHED may preferably further transmit to the second base station BS2 the identifier for the first mobile station MS1 MS1-IND, an identifier for the second mobile station MS2 MS2-IND, an indication RRI1-M51, that the first radio resources may be applied for the first mobile station MS1 and a further indication RRI2-MS2, that the second radio resources may be applied for the second mobile station MS2.

According to an even further preferred embodiment, when a PMI for a radiation beam has been deleted from the mapping table MT in the step M1/9 and when a second indication or several second indications RRI2 for second radio resources of the radiation beam have been transmitted to the second base station BS2 in one of the previous method cycles, in the step M1/11, the scheduler SCHED transmits to the second base station BS2 the second indication or the several second indications RRI2 for the second radio resources and a further indication RRI2-STOP, that the second radio resources are used or transmitted without reduced transmission power by the first base station (BS1) in future time slots or frames. Thereby, the second base station BS2 gets knowledge, that the second radio resources are no longer available without interference or without reduced interference.

In a next step M1/13, the second base station BS2 schedules for example user data DATA for the second mobile station MS2 by applying one or several of the first radio resources.

In a further step M1/14, the second base station BS2 transmits the user data DATA to the second mobile station MS2, which receives the user data DATA in a next step M1/15.

Steps M1/9 to M1/12 allow for a semi-static behaviour without requiring subframe by subframe decisions about which interfering beam or interfering beams from the first base station BS1 should be restricted in use. The decision, which interfering beam(s) from the first base station BS1 should be restricted is repeatedly taken but on a time scale, which may be much larger than a time length of a sub-frame, which is 1 ms in case of 3GPP LTE. The time scale may be for example one or several minutes or one or several hours.

Figure 6:
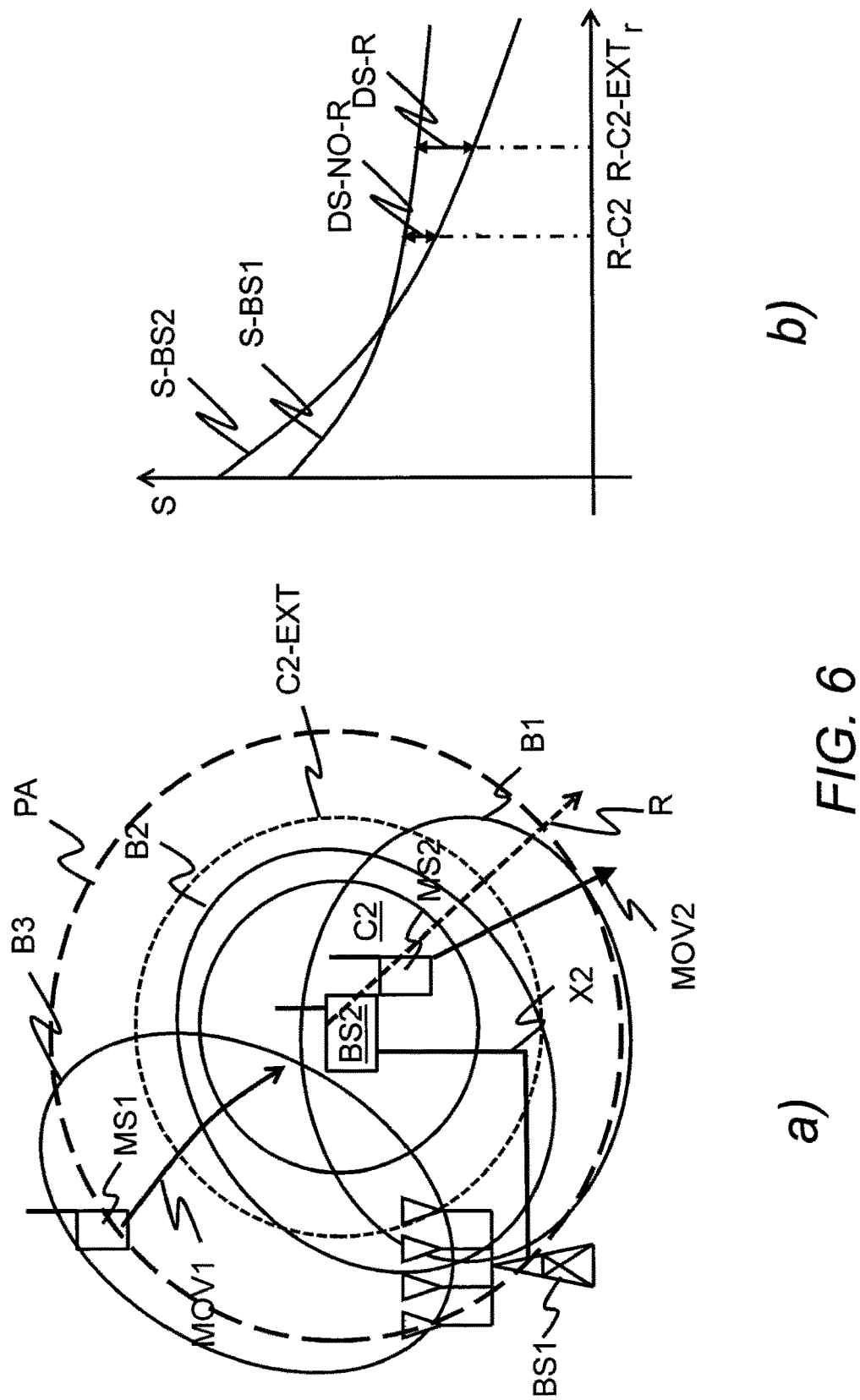
FIG. 6 shows a block diagram of the first base station and the second base station according to an even further embodiment of the invention and signal strengths of radio frequency signals transmitted by the first base station and the second base station as a function of a distance from a central point of a coverage area of the second base station according to the even further embodiment of the invention.

According to a further embodiment, the second base station BS2 may operate the second radio cell with a range extension for having an extended second radio cell C2-EXT. Principles of the range extension are described for example in 3GPP TR 36.814 V9.0.0 (2010-03) section chapter 31.2. Thereby, mobile stations are served by the second base station BS2 although a first signal strength of the first radio frequency signals received from the first base station BS1 is a predefined amount higher than a second signal strength of second radio frequency signals received from the second base station BS2. For a direction R from a centre of the second radio cell C2 and of the extended second radio cell C2-EXT radial to border areas of the second radio cell C2 and the extended second radio cell C2-EXT, signal strengths S for the first signal strength S-BS1 and the second signal strength S-BS2 are shown in FIG. 6b) as a function of a distance from the centre of the second radio cell C2 and the extended second radio cell C2-EXT. The border areas of the second radio cell C2 and the extended second radio cell C2-EXT may indicate locations of the mobile stations M31, MS2, which trigger a handover of the mobile stations between the first base station BS1 and the second base station BS2. If for example for the first mobile station MS1 no range extension is applied, if the first mobile station MS1 is served by the second base station BS2 and if the first mobile station MS1 moves from the centre of the second radio cell C2 to the border area of the second radio cell C2, a handover from the second base station BS2 to the first base station BS1 will be executed if the first signal strength S-BS1 exceeds the second signal strength S-BS2 with a first predefined difference value DS-NO-R. If for example for the second mobile station MS2 the range extension is applied, if the second mobile station MS2 is also served by the second base station BS2 and if the second mobile station MS2 moves from the centre of the extended second radio cell C2-EXT to the border area of the extended second radio cell C2-EXT, a handover from the second base station BS2 to the first base station BS1 will be executed if the first signal strength S-BS1 exceeds the second signal strength BS2 with a second predefined difference value DS-R, which is larger than the first predefined difference value DS-NO-R.

Serving the second mobile station MS2 by the second base station BS2 may be applied in sub-frames (compare with FIG. 4), that are blanked by the first base station BS1 especially for the range extension functionality of the second base station BS2. The first mobile station MS1, which is served by the first base station BS1 is not scheduled by using the blanked sub-frames. If the range extension would be applied for all mobile stations MS1, M52, it might happen exemplarily for a configuration as shown in FIG. 6a), that a handover from the first base station BS1 to the second base station BS2 or from the second base station BS2 to the first base station BS1 never occur, when the mobile stations MS1, MS2 are located within a coverage area of one of the radiation beams such as the second radiation beam B2. This would mean that the PMI of the second radiation beam B2, which overlaps with a centre of the extended radio cell C2-EXT, would never be transmitted from one of the mobile stations MS1, MS2 to the first base station BS1, when a handover of the mobile stations MS1, MS2 is executed between the first base station B51 and the second base station BS2. For avoiding this problem and to get knowledge from time to time of interfering radiation beams of the first base station BS1 with respect to the centre of the extended radio cell C2-EXT, preferably the first base station BS1 performs additional steps with a periodicity of for example minutes or hours as described in the following, if the range extension functionality at the second base station BS2 is switched on. For the coverage area of the second base station BS2 a range extension may be applied by either preventing a handover from the second base station BS2 to the first base station BS1 as long as a signal strength of first radio frequency signals transmitted by the first base station BS1 and measured by the first mobile station MS1 or by the second mobile station MS2 is not the second predefined difference value DS-R larger (see FIG. 6b)) than a signal strength of second radio frequency signals transmitted by the second base station BS2 and measured the first mobile station MS1 or by the second mobile station MS2 or triggers a handover from the first base station BS1 to the second base station BS2, if the signal strength of the second radio frequency signals and measured by the first mobile station MS1 or by the second mobile station MS2 is at most the second predefined difference value DS-R smaller than the signal strength of the first radio frequency signals and measured by the first mobile station MS1 or by the second mobile station M52.

The first base station BS1 may select preferably with a predefined time period such as one or several minutes or hours the first mobile station MS1 and/or the second mobile station MS2 as a single test mobile station or as several test mobile stations for inspecting a centre part of the extended radio cell C2-EXT with respect to interfering radiation beams of the first base station BS1. Therefore, the first base station BS1 applies for the first mobile station MS1 and/or the second mobile station MS2 no range extension for the coverage area C2 of the second base station BS2 by triggering the handover from the second base station BS2 to the first base station BS1, if the signal strength of the second radio frequency signals and measured by the first mobile station MS1 or by the second mobile station MS2 is the first predefined difference value DS-NO-R smaller than the signal strength of the first radio frequency signals and measured by the first mobile station MS1 or by the second mobile station MS2 or by preventing the handover from the first base station BS1 to the second base station BS2 as long as the signal strength of the second radio frequency signals and measured by the first mobile station MS1 or by the second mobile station MS2 is at least the first predefined difference value DS-NO-R larger than the signal strength of the first radio frequency signals and measured by the first mobile station MS1 or by the second mobile station MS2.

By using the further embodiment with respect to the extended radio cell C2-EXT, the first base station BS1, the second base station BS2 or both base stations BS1, BS2 are updated with one or several identifiers of one or several mobile stations, for which the first predefined difference value DS-NO-R shall be applied for determining a handover decision between the first base station BS1 and the second base station BS2.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as " . . . unit" or "means for . . . " shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements of the processing unit PU, which is shown in FIG. 3, may be provided through the use of dedicated hardware as well as the through the use of hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context. It should be appreciated by those skilled in the art that any block diagrams herein represent conceptual views of illustrative circuitry embodying the principles of the invention.

The invention claimed is:

1. A method for interference reduction in a radio communication system, said method comprising:
   receiving, at a processing unit of a first base station, from at least one mobile station indications of radiation beams that are transmitted by the first base station of said radio communication system and that fulfill or exceed a predefined quality criterion at said at least one mobile station, when said at least one mobile station is attached to said first base station and when said at least one mobile station is located within a first overlapping coverage area of said first base station and of a second base station of said radio communication system,
   controlling, at said processing unit, whether said indications have been received at said first base station before or after a handover of said at least one mobile station from said first base station to said second base station or from said second base station to said first base station, and
   determining, at said processing unit, at least one radio resource to be unused or to be transmitted with a predefined difference below a maximum transmission power by said first base station for at least one radiation beam of said radiation beams based on said received indications for serving said at least one mobile station or at least one further mobile station by said second base station with said at least one radio resource,
   wherein the at least one radiation beam is taken into account for said determining, if the received indication for the corresponding radiation beam was received before or after said handover.

2. The method according to claim 1, wherein said indications are pre-coding matrix indicators, wherein said pre-coding matrix indicators are handled as best pre-coding matrix indicators, when said at least one mobile station is connected to and served by said first base station,
   wherein said pre-coding matrix indicators are handled as worst pre-coding matrix indicators, when said at least one mobile station or said at least one further mobile station is connected to and served by said second base station.

3. The method according to claim 1, wherein said controlling comprises:
   verifying, whether said indications have been received within a first predefined time interval before the handover of said at least one mobile station from said first base station to said second base station or within a second predefined time interval after the handover of said at least one mobile station from said second base station to said first base station,
   wherein said radiation beam indicated by said one of said received indications is taken into account for said determining, if said one of said received indications has been received within said first predefined time interval or within said second predefined time interval.

4. The method according to claim 1, wherein said controlling comprises:
   determining, which of said indications is a last indication received before the handover of said at least one mobile station from said first base station to said second base station or is a first indication received after the handover of said at least one mobile station from said second base station to said first base station,
   wherein said radiation beam indicated by said one of said received indications is taken into account for said determining, if said one of said received indications is the last indication or the first indication.

5. The method according to claim 1, wherein a first radiation beam of said radiation beams is adjacent to or overlaps with a second radiation beam of said radiation beams, wherein said second radiation beam is adjacent to or overlaps with a third radiation beam of said radiation beams,
   wherein said second radiation beam is taken into account for said determining, if indications for said first radiation beam and said third radiation beam are received at said processing unit.

6. The method according to claim 1, wherein the at least one radiation beam is taken into account for said determining, if said at least one radiation beam was indicated with a predefined frequency of occurrence.

7. The method according to claim 1, wherein said predefined quality criterion is either of the following:

a largest signal to noise ratio of radio frequency signals of a single radiation beam of said radiation beams received at said at least one mobile station, a largest signal to interference-plus-noise ratio of said radio frequency signals of one radiation beam of said radiation beams received at said at least one mobile station, a largest signal to interference ratio of said radio frequency signals of a select radiation beam of said radiation beams received at said at least one mobile station.

8. The method according to claim 1, wherein said predefined quality criterion is a single radiation beam with a maximum received signal quality or a group of at least two radiation beams with a received signal quality above a predefined received signal quality.

9. The method according to claim 1, wherein said first base station is a macro base station, wherein said second base station is a micro base station, a pico base station or a femto base station, wherein a second coverage area of said second base station is located within or intersects with a first coverage area of said first base station.

10. The method according to claim 9, further comprising:

applying a range extension to said second coverage area of said second base station by:

preventing the handover from said second base station to said first base station where a first signal strength of first radio frequency signals transmitted by said first base station and measured by said at least one mobile station or by said at least one further mobile station are not a first predefined magnitude larger than a second signal strength of second radio frequency signals transmitted by said second base station and measured by said at least one mobile station or by said at least one further mobile station, or triggering the handover from said first base station to said second base station where said second signal strength of said second radio frequency signals and measured by said at least one mobile station or by said at least one further mobile station are at most said first predefined magnitude smaller than said first signal strength of said first radio frequency signals and measured by said at least one mobile station or by said at least one further mobile station.

11. The method according to claim 10, further comprising:

selecting, with a predefined time period, the at least one mobile station or the at least one further mobile station as a test mobile station for inspecting a center part of the second coverage area with respect to interfering radiation beams of the first base station, and not applying the range extension to the second coverage area of the second base station for the at least one mobile station or the at least one further mobile station by:

triggering the handover from the second base station to the first base station where the second signal strength of the second radio frequency signals and measured by the at least one mobile station or by the at least one further mobile station are a second predefined magnitude smaller than the first signal strength of the first radio frequency signals and measured by the at least one mobile station or by the at least one further mobile station, or preventing the handover from the first base station to the second base station where the second signal strength of the second radio frequency signals and measured by the at least one mobile station or by the at least one further mobile station are at least the second predefined magnitude larger than the first signal strength of the first radio frequency signals and measured by the at least one mobile station or by the at least one further mobile station, wherein the first predefined magnitude is larger than the second predefined magnitude.

12. The method according to claim 11, wherein said at least one further mobile station is located within a second overlapping coverage area of said first base station and of said second base station, said method further comprising:

determining, at said processing unit, at least one further radio resource to be unused or to be transmitted with said limited transmission power by said first base station for at least one further radiation beam based on said received indications for serving said at least one further mobile station by said second base station with said at least one further radio resource, and transmitting, from said processing unit to said second base station, a first indication or several first indications for said at least one radio resource and a second indication or several second indications for said at least one further radio resource.

13. A processing unit for a first base station of a radio communication system to facilitate interference reduction in the radio communication system, the processing unit comprising:

at least one processor, said at least one processor configured to:

receive from at least one mobile station indications of radiation beams that are transmitted by the first base station of said radio communication system and that fulfill or exceed a predefined quality criterion, when said at least one mobile station is attached to said first base station and when said at least one mobile station is located within an overlapping coverage area of said first base station and of a second base station of said radio communication system, control whether said indications have been received at said first base station before or after a handover of said at least one mobile station from said first base station to said second base station or from said second base station to said first base station, and determine at least one radio resource to be unused or to be transmitted with a limited transmission power by said first base station for at least one radiation beam of said radiation beams based on said received indications for serving said at least one mobile station or at least one further mobile station by said second base station with said at least one radio resource, wherein the at least one radiation beam is taken into account by the at least one processor in conjunction with determining the at least one radio resource, if the received indication for the corresponding radiation beam was received before or after said handover.

14. The processing unit according to claim 13, wherein the processing unit is a wireless transmitter, a wireless transceiver or a modem unit board.

15. A wireless access network node comprising the processing unit according to claim 13.

16. The method according to claim 11, further comprising:

verifying, at said processing unit, whether an indication for the at least one radiation beam was received from said at least one mobile station, when said at least one mobile station is traversing said second coverage area of said second base station with a speed that is equal to or exceeds a predefined speed value for preventing the handover of said at least one mobile station from said first base station to said second base station, wherein said radiation beam indicated by said one of said received indications is taken into account for said determining, if said at least one mobile station is traversing said second coverage area of said second base station with said speed that is equal to or exceeds said predefined speed value.

17. The processing unit according to claim 13, wherein the at least one processor is configured to verify, whether the indications have been received within a first predefined time interval before the handover of the at least one mobile station from the first base station to the second base station or within a second predefined time interval after the handover of the at least one mobile station from the second base station to the first base station, wherein the radiation beam indicated by the one of the received indications is taken into account for the determining, if the one of the received indications has been received within the first predefined time interval or within the second predefined time interval.

18. The processing unit according to claim 13, wherein the at least one processor is configured to determine, which of the indications is a last indication received before the handover of the at least one mobile station from the first base station to the second base station or is a first indication received after the handover of the at least one mobile station from the second base station to the first base station, wherein the radiation beam indicated by the one of the received indications is taken into account for the determining, if the one of the received indications is the last indication or the first indication.

19. The processing unit according to claim 13, wherein the first base station is a macro base station, wherein the second base station is a micro base station, a pico base station or a femto base station, wherein a second coverage area of the second base station is located within or intersects with a first coverage area of the first base station.

20. The processing unit according to claim 19, wherein the at least one processor is configured to apply a range extension to the second coverage area of the second base station by:

preventing the handover from the second base station to the first base station where a first signal strength of first radio frequency signals transmitted by the first base station and measured by the at least one mobile station or by the at least one further mobile station are not a first predefined magnitude larger than a second signal strength of second radio frequency signals transmitted by the second base station and measured by the at least one mobile station or by the at least one further mobile station, or triggering the handover from the first base station to the second base station where the second signal strength of the second radio frequency signals and measured by the at least one mobile station or by the at least one further mobile station are at most the first predefined magnitude smaller than the first signal strength of the first radio frequency signals and measured by the at least one mobile station or by the at least one further mobile station.

* * * * *